United States Patent [19]
Takke

[11] Patent Number: 4,815,883
[45] Date of Patent: Mar. 28, 1989

[54] SPHERICAL HEAD COUPLING FOR BOWDEN CABLES

[75] Inventor: Wilhelm Takke, Oberursel, Fed. Rep. of Germany

[73] Assignee: Max Kammerer GmbH, Fed. Rep. of Germany

[21] Appl. No.: 142,860
[22] PCT Filed: Feb. 10, 1987
[86] PCT No.: PCT/EP87/00062
§ 371 Date: Dec. 24, 1987
§ 102(e) Date: Dec. 24, 1987
[87] PCT Pub. No.: WO87/05083
PCT Pub. Date: Aug. 27, 1987

[30] Foreign Application Priority Data
Feb. 24, 1986 [DE] Fed. Rep. of Germany ....... 3605862

[51] Int. Cl.$^4$ .............................................. F16D 1/00
[52] U.S. Cl. ........................................ 403/24; 403/76; 403/141
[58] Field of Search ............... 403/71, 70, 76, 141, 403/24

[56] References Cited
U.S. PATENT DOCUMENTS
4,084,913 4/1978 Schenk ................................ 403/141
4,118,131 10/1978 Schnitzius ............................ 403/24
4,590,816 5/1986 Spease et al. ..................... 403/141 X FOREIGN PATENT DOCUMENTS
1556762 12/1968 France .
2082245 3/1982 United Kingdom .

Primary Examiner—Andrew V. Kundrat
Attorney, Agent, or Firm—Robert J. Koch

[57] ABSTRACT

Spherical head coupling for Bowden cables to establish a connection between actuator and control elements in automotive vehicles, wherein the Bowden cable is equipped with a terminal piece exhibiting a ball socket and the actuator or control element with a spherical cap held in the ball socket. The ball socket is formed by a spherical cap of a low height, i.e., a height that is less than the length of one half of the sphere diameter, wherein the spherical head is encompassed on its side facing away from the spherical cap by a counter support held on a laterally elastic bar extending parallel to the center plane of the spherical head. The spring elastic bar is offset in its location from the center plane in the direction of the insertion side of the spherical head and the counter support encompasses the spherical head on the opposite side. The connection section between the counter support and the spring elastic bar is bevelled off while forming an oblique surface, so that on the insertion side an insertion funnel is formed for the spherical head, together with a subsequent surface at a distance from the bottom of the cap corresponding to the diameter of the spherical head.

5 Claims, 1 Drawing Sheet

SPHERICAL HEAD COUPLING FOR BOWDEN CABLES

BACKGROUND OF THE INVENTION

1. Field of the Invention

The invention concerns a spherical head coupling for Bowden cables, particularly for establishing a connection between an actuator and a control element in automotive vehicles, wherein the Bowden cable is equipped with a terminal piece comprising a ball socket and the actuator or control element exhibits a spherical head held in the ball socket.

2. Description of the Related Technology

In a known spherical head coupling for the above purpose, the opening diameter of the essentially closed ball socket and the diameter of the spherical head are correlated so that the spherical head may be brought to snap into the socket with a certain force by utilizing the elasticity of the material and is held in a freely gliding manner after the insertion or snapping in. The disadvantage of the Bowden coupling is that their mounting, alignment and potential disassembling involves considerable difficulties, if the application must take place under tight space conditions and/or in poorly accessible locations as in the engine compartment of automotive vehicles. This is in order to assure a joint of adequate strength; the opening of the ball socket and spherical head itself must be dimensioned in an overlapping manner so that considerable force is required, which under the tight space conditions and in less accessible locations is difficult to apply. The same is true to an even greater extent if removal of the Bowden cable is necessary, as the tensile forces required in this case are significantly more difficult to apply. Furthermore, after repeated mounting and removal operations expanded locations appear generally in the plastic ball socket, whereby the holding force of the connection is weakened, so that after only a few such mountings the Bowden cable must be replaced entirely.

SUMMARY OF THE INVENTION

It is an object of the present invention to provide a Bowden connection enabling simple mounting and removal, and insuring a connection satisfying all operational requirements relative to strength. The invention includes a ball socket formed by a spherical cap having a low height, i.e. a height that is less than the length of a half diameter of the spherical head. The spherical head is encompassed on the side facing away from the spherical cap by a counter support that is held by a lateral spring elastic bar extending parallel to the center plane of the spherical had, where the spring bar is offset toward the insertion side of the spherical head from the center plane and the counter support encompasses the spherical head on the side opposite the insertion opening.

The invention provides a Bowden cable connection that is simple to mount and to remove and satisfies all operational requirements relative to its stength. By means of the positive connection between the spherical cap on the one side and the counter support fastened to a spring bar and holding the spherical head on the side opposite the spherical cap, the counter support may be bend readily in the lateral direction during the insertion of the spherical head for mounting, so that the mounting operation may be carried out with application of the slightest force possible. In contrast, following the entry of the spherical head into the spherical cap and the corresponding resnapping of the counter support on its spring bar, any unintentional extraction of the spherical head is excluded by the extra-axial position of the spring bar, which results in the counter support occupying, in its "normal position", relative to the pivoting circle of the counter support, a position bend out from the radial center location and in the case of tension applied to the spherical head would have to be drawn into this radial center position. In this manner, the spherical head is pressed by a tensile force applied to it with a higher force into the spherical cap, so that any unintentional extraction of the spherical head from its holder is prevented in a self-reinforcing fashion. An intentional extraction, on the other hand, is again possible with the application of a very small force by bending the counter support outward, with or without the use of a tool.

In a further embodiment of the invention, it is advantageous to bevel off the connecting section between the counter support and the spring bar in a manner such that on the insertion side an insertion funnel for the spherical head and a subsequent surface at a distance from the bottom of the spherical cap. The introduction of the spherical head into its holder is thereby considerably simplified, without affecting the strength and stability of the joint.

The invention will become more apparent from the embodiment illustrated in the drawing.

DETAILED DESCRIPTION OF THE PREFERRED EMBODIMENT

Figure 1:
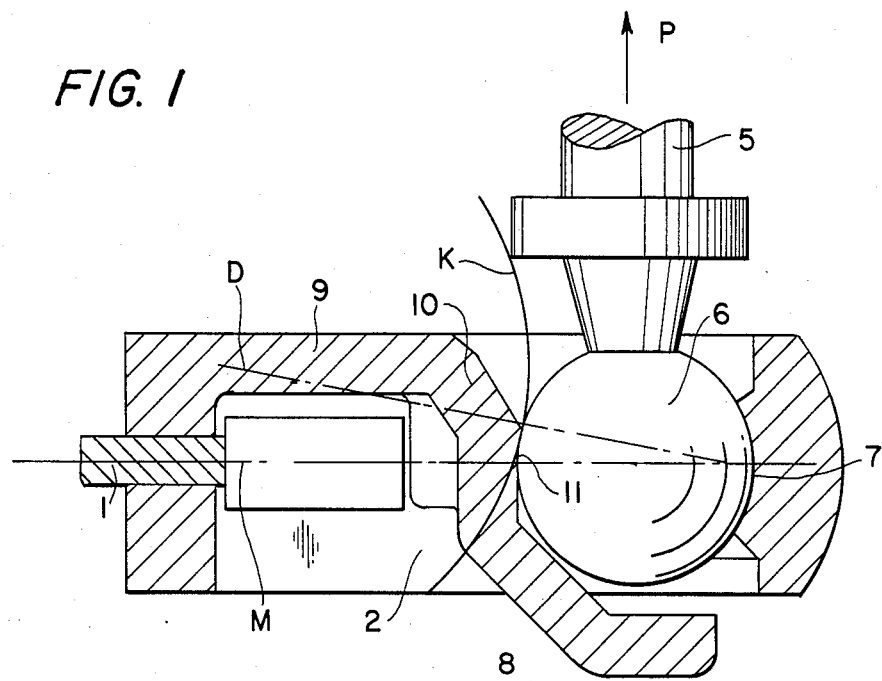
FIG. 1 shows a section through a spherical head connection according to the invention.
Figure 2:
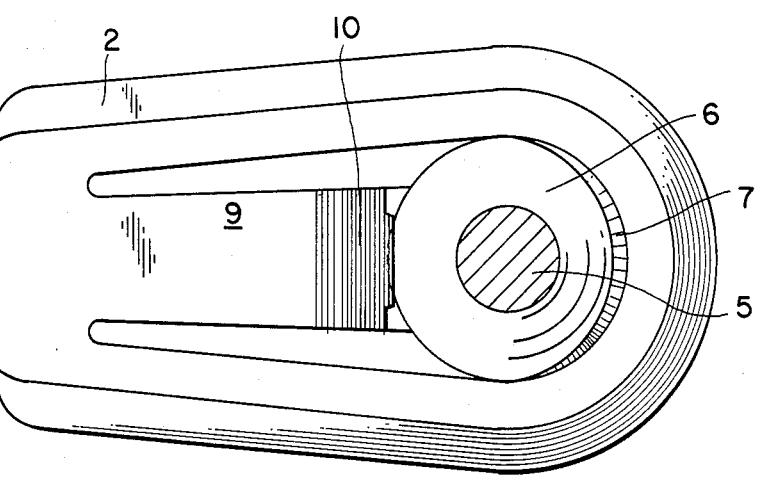
FIG. 2 shows a top elevation of FIG. 1.

The spherical head coupling for Bowden cables shown in the drawing includes a terminal piece 2, serving to establish a connection between the Bowden cable 1 leading to the actuator element and the control element attached to the lever 5. The spherical head 6 and a ball socket are cooperating in the process, wherein the ball socket is formed by a spherical cap 7 having a low height, i.e. a height that is less than the length of one half diameter of the sphere and the spherical head 6 is encompassed on its side facing away from the spherical cap 7 by counter support 8 held on a lateral spring elastic bar 9 extending parallel to the center plane M of the ball socket. The spring elastic bar 9 is offset in its location from the center plane M in the direction of the insertion side of the spherical head, while the counter support 8 encompasses the spherical head on the opposite side. The connecting section between the counter support and the spring bar 9 is bevelled off so that on the insertion side a surface 10 forming an insertion funnel for the spherical head 6 is created, with the subsequent, essentially flat surface 11 being at a distance corresponding to the diameter of the spherical head 6 from the bottom of the spherical cap 7.

For its mounting, the spherical head 6 is introduced into the insertion opening and brought in contact with the spherical cap 7 while pivoting the counter support 8, whereupon the counter support 8 returns elastically into the position shown in FIG. 1, in which the spherical head 6 is held clamped in the spherical cap 7. If a tensile force is applied to the spherical head in the direction of the arrow P, the spherical head will tend to entrain the counter support 8, while pivoting it around the point of rotation D of the spring bar 9 on the circular arc K. The circular arc K, which intersects the center plane M in the point of contact between the spherical head 6 and the counter support 8, clearly extends into the sphere, as viewed in the tensile direction P, from which it is seen that the counter support 8 is pressing the spherical head 6 in such a case into the spherical cap 7 with a force proportional to the tensile force applied. The spherical head 6 is thus retained in a practically unreleasable manner in the terminal piece 2.

For the intentional release of the spherical head it is sufficient to pivot the counter support 8 by a slight pressure on the spring bar 9, in the direction against the arrow by hand or by means of a tool, whereby the spherical head is released and may be extracted without the application of force. There is no stressing or wear of the material, so that mounting and removal operations may be repeated any number of times without damaging the joint.

I claim:

1. An automotive actuator to control element coupling comprising:
   a bowden cable terminal piece defining a ball socket, said terminal piece includes a spherical cap and a counter support opposing said spherical cap wherein said spherical cap exhibits a height of less than half a diameter of said ball socket defined between said spherical cap and said counter support;
   a lateral spring elastic bar, carrying said counter support, connected to said terminal piece and extending parallel to a ball socket center plane which runs through said spherical cap and opposing counter support, said elastic bar is offset from said center plane on an insertion side of said terminal piece; and
   a blocking member connected to said counter support positioned to block said ball socket on a side opposing said insertion side of said terminal piece.

2. A coupling according to claim 1 wherein said lateral spring elastic bar further comprises a beveled portion adjacent to said counter support defining an insertion funnel or guide.

3. A coupling according to claim 2 further comprising a spherical head corresponding in diameter to said ball socket and adapted for reception in said ball socket.

4. A coupling according to claim 3 further comprising a bowden cable connected to said terminal piece.

5. A coupling according to claim 4 further comprising a lever connected to said spherical head.

* * * * *